(12) United States Patent
Wiley et al.

(10) Patent No.: US 9,350,743 B2
(45) Date of Patent: *May 24, 2016

(54) CONTROLLING OPERATION OF A MACHINE AND DESCRIBING ACTIONS PERFORMED BY THE MACHINE THROUGH A SOCIAL NETWORKING SYSTEM

(71) Applicant: Facebook, Inc., Menlo Park, CA (US)

(72) Inventors: Scott C. Wiley, Los Altos, CA (US); Adam Michael Beaton, Clifton, VA (US); Alan Dean Olsen, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/508,853

(22) Filed: Oct. 7, 2014

(65) Prior Publication Data

US 2016/0099946 A1    Apr. 7, 2016

(51) Int. Cl.
   *H04L 29/06* (2006.01)

(52) U.S. Cl.
   CPC ............ *H04L 63/102* (2013.01); *H04L 65/403* (2013.01)

(58) Field of Classification Search
   CPC .................................................... H04L 63/102
   USPC ............................................................ 726/4
   See application file for complete search history.

(56) References Cited

U.S. PATENT DOCUMENTS 8,706,631 B2 *  4/2014  Gupta ................ G06Q 30/0601
                                                                    455/406
9,083,728 B1 *  7/2015  Lavian ..................... H04L 67/38

OTHER PUBLICATIONS

Brocher—(WO 2014-096954: "A Method and Device to Connect to a Wireless Network"—Jun. 26, 2014).*

* cited by examiner

*Primary Examiner* — Longbit Chai
(74) *Attorney, Agent, or Firm* — Fenwick & West LLP

(57) ABSTRACT

A social networking system includes information identifying a machine (e.g., a robot, a drone, a computer, a thermostat, etc.) and a connection between the machine and an owner of the machine, which is a user of the social networking system capable of authorizing an action by the machine. The owner of the machine associates permissions associated with various actions by the machine, where a permission associated with an action identifies one or more criteria for performing the action. Permissions may specify types of connections between social networking system users and the owner of the machine via the social networking system to allow social networking system users with specific types of connections to the owner of the machine to perform certain actions using the machine. Information describing an action performed by the machine may be communicated to other users of the social networking system via any suitable communication channel.

20 Claims, 4 Drawing Sheets

CONTROLLING OPERATION OF A MACHINE AND DESCRIBING ACTIONS PERFORMED BY THE MACHINE THROUGH A SOCIAL NETWORKING SYSTEM

BACKGROUND

This disclosure relates generally to social networking systems, and more specifically to regulating performance of actions of a machine via a social networking system.

An online system, such as a social networking system, allows its users to connect to and communicate with other online system users. Users may create profiles on an online system that are tied to their identities and include information about the users, such as interests and demographic information. The users may be individuals or entities such as corporations or charities. Establishing connections with other users via an online system allows a user to more easily share content with the other users.

Additionally, users are increasingly able to access various machines via client devices, allowing users to remotely configure and control their machines. For example, users may modify thermostat settings via an application executing on a mobile device or retrieve vehicle diagnostic information using another application executing on the mobile device. However, different applications are associated with different machines, making it inconvenient for a user to remotely configure or control multiple machines.

Further, conventional applications for remotely controlling a machine limit control of the machine to a user having an application associated with the machine installed on a client device. But a user may benefit if additional users are capable of accessing a machine associated with the user to retrieve information or to perform actions via the machine. Conventional systems require each user accessing a machine to have an application associated with the machine installed on a client device associated with the user, which allows multiple users to control or access the machine but makes it impractical for a user to regulate or limit interactions with the machine other users are authorized to perform.

SUMMARY

A social networking system stores connections between various users allowing users to exchange content with each other. Additionally, the social networking system stores information identifying a machine, which is a device that receives one or more instructions and performs an action in response to the one or more instructions. For example, a machine receives a control signal from the social networking system and performs an action based on the control signal. Example machines include: a thermostat, an automobile, a drone, a toaster, a computer, a refrigerator, an air conditioner, a robot, a vacuum, an actuator, and a heater. The social networking system includes information identifying the machine and one or more connections between the machine and one or more users capable of authorizing one or more actions associated with the machine, also referred to herein as "owners."

The stored information also includes various permissions associated with the machine, with each permission associated with an action performed by the machine and regulating users of the social networking system who, in addition to the owner of the machine, are authorized to perform the action. The owner of the machine specifies or modifies permissions associated with various actions. A permission associated with an action specifies a type of connection between a user of the social networking system and the owner of the machine that authorizes the user to perform the action. In one embodiment, the type of connection between a user and an owner of the machine is based on whether the user is directly or indirectly connected to the owner of the machine. Different types of indirect connections may be specified based on a number of intervening users between the user and the owner of the machine (i.e., based on a degree of separation between the user and the owner of the machine). For example, a permission associated with an action allows a user having a direct connection to the owner of the machine to perform the action while preventing another user having an indirect connection to the owner of the machine from performing the action. Alternatively, a permission specifies a user having a connection to an owner of the machine having a specified connection strength is authorized to perform an action associated with the permission, while preventing another user having a connection to the owner of the machine with less than the specified connection strength from performing the action.

Additionally, the owner of the machine provides the social networking system with descriptions associated with one or more actions performed by the machine. A description associated with an action includes information for presentation to one or more additional social networking system users when the action is performed. Further, the description associated with the action includes mapping information included in a request to perform the action received by the social networking system with commands or instructions for communicating to the machine to perform the action. Similarly, the description associated with the action identifies content presented to one or more users of the social networking system when an indication indicating the machine performed the action is received by the social networking system from the machine.

When the social networking system receives a request for the machine to perform an action from a requesting user, if the requesting user does not have a connection to the machine via the social networking system indicating the requesting user is an owner of the machine, the social networking system determines a connection between the requesting user and the owner of the machine and determines a type of the connection between the requesting user and the owner of the machine and compares the type of connection to a permission associated with the action identified by the request. If the type of connection between the requesting user and the owner of the machine matches a type of connection specified by the permission associated with the action, the social networking system determines the requesting user is authorized to perform the action and communicates an instruction to perform the action to the machine. If the type of connection between the requesting user and the owner of the machine does not match the type of connection specified by the permission associated with the action, the social networking system determines the requesting user is not authorized to perform the action.

The social networking system presents information describing the action to the requesting user via the client device, and may also present information describing the action to additional users having a connection to the requesting user. For example, the social networking system presents a notification message to the user via the client device indicating the machine performed the action and may include information received from the machine based on the action in the notification message. To present information describing the action, the social networking system generates a content item identifying the requesting user, identifying the machine, and describing the action, and presents the generated content to additional users connected to the requesting user via the social networking system. If information from the machine is received when the action was performed, a portion of the received information may be included in the received content item.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
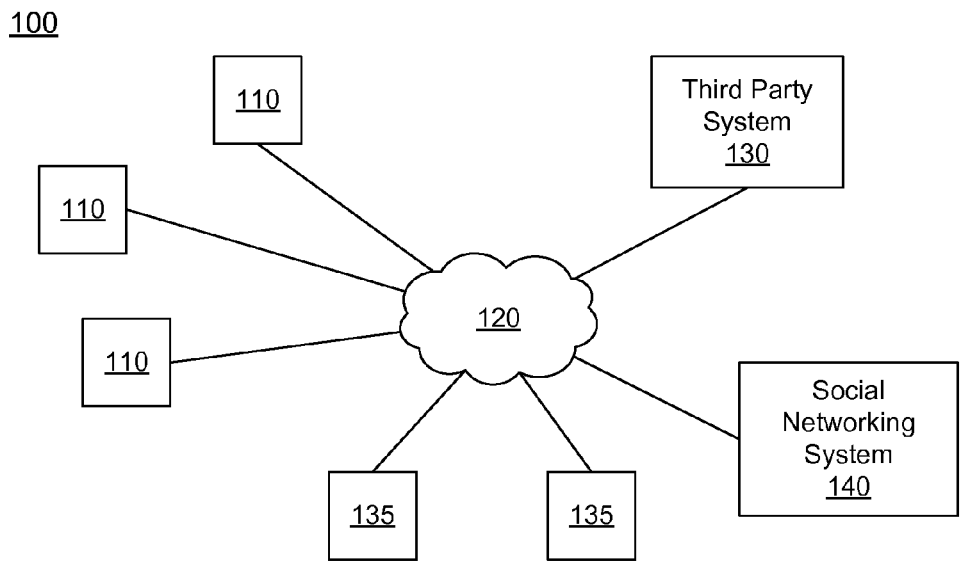
FIG. 1 is a block diagram of a system environment in which a social networking system operates, in accordance with an embodiment.

FIG. 1 is a block diagram of a system environment 100 for a social networking system 140, such as a social networking system. The system environment 100 shown by FIG. 1 comprises one or more client devices 110, a network 120, one or more third-party systems 130, one or more machines 135, and the social networking system 140. In alternative configurations, different and/or additional components may be included in the system environment 100. The embodiments described herein may be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Additionally, one or more machines 135 are coupled to the network 120 for communicating with the social networking system 140, with one or more client devices 110, or with one or more third party systems 130. A machine 135 is a device that receives one or more instructions and performs an action in response to the one or more instructions. For example, a machine receives a control signal from the social networking system 135 or from a client device 110 and performs an action based on the control signal. Example machines 135 include: a thermostat, an automobile, a drone, a toaster, a refrigerator, an air conditioner, a robot, a vacuum, a computer, and a heater. Additionally a client device 110 may be a machine 135. One or more permissions are associated with a machine 135, where each permission is associated with an action and specifies one or more criteria for performing an action. The permissions may be communicated from the machine 135 to the social networking system 140. Permissions and communication between a machine 135 and the social networking system 140 are further described below in conjunction with FIGS. 2-4.

Figure 2:
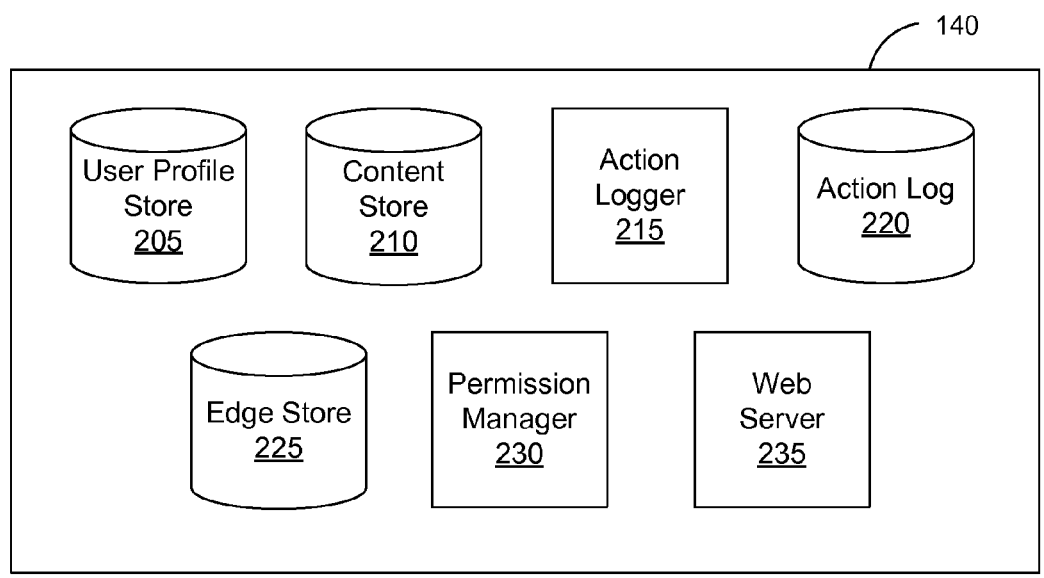
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a permission manager 230, and a web server 235. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, online system users are encouraged to communicate with each other by posting text and content items of various types of media to the social networking system 140 through various communication channels. This increases the amount of interaction of users with each other and increases the frequency with which users interact within the social networking system 140.

One or more objects associated with machines 135 are included in the content store 210 in various embodiments. An object associated with a machine 135 includes an identifier associated with the machine 135 that uniquely identifies the machine 135. In various embodiments, the object associated with the machine 135 also includes additional information describing the machine 135. For example, the object associated with the machine 135 includes one or more of: a description of the machine 135 (e.g., a manufacturer, a model number, a name), a description of the machine 135, a name associated with the machine 135 by a user of the social networking system 140 capable of authorizing actions associated with the machine 135, a location associated with the machine 135, permissions associated with the machine 135 each associated with an action and identifying one or more criteria to be satisfied for the action to be performed, or other suitable information. Additionally, an object associated with a machine 135 includes information describing actions associated with the machine 135, such as instructions or commands for communication from the social networking system 140 to the machine 135 to cause the machine 135 to perform the action. For example, an application programming interface describing instructions or commands for communication to the machine 135 to perform one or more actions. Additionally, information associated with actions associated with the machine 135 includes text or image data for presentation to social networking system users to identify the actions.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. An edge between a user and another user may be associated with a connection strength specified by the user and providing information about a relationship between the user and the other user. For example, connections between a user and other users with which the user has a close relationship, such as family members, have relatively high connection strengths, while connections between the user and additional users with which the user has a more distant relationship have lower connection strengths. In some embodiments, a user selects from connection strengths associated with different types of relationships (e.g., family members, co-workers, friends, partners, etc.) when specifying a connection with another user, and the edge store 225 associates a selected connection strength with an edge describing the connection. Other edges are generated when users interact with objects in the social networking system 140, such as expressing interest in a page on the social networking system 140, sharing a link with other users of the social networking system 140, and commenting on posts made by other users of the social networking system 140.

The edge store 225 includes an edge representing a connection between an object associated with a machine 135 and a user profile associated with a user capable of authorizing one or more actions associated with the machine 135, also referred to herein as an "owner" of the machine. Multiple edges between an object associated with a machine 135 and different owners of the machine 135 may be stored in the edge store 225 to identify various owners of the machine 135. Additionally, edges between an object associated with the machine 135 and other users of the social networking system 140 may identify connections between the other users and the machine 135. As further described below in conjunction with FIG. 3, information associated with a connection between a user and a machine 135 (e.g., a type of the connection) may allow the user to perform certain actions using the machine 135. In some embodiments, the edge store 225 also includes edges representing connections between objects associated with different machines 135, allowing the corresponding machines 135 to exchange information with each other via the social networking system 140 (e.g., a machine 135 may be an owner of an additional machine 135 or may otherwise communicate information to or perform actions using the additional machine 135). Additionally, a connection between an object associated with a machine 135 and an additional object associated with an additional machine 135 may identifies the machine 135 as an owner of the additional machine 135; this allows the machine 135 to specify permissions for authorizing users to perform actions associated with the additional machine 135.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate a user's interest in an object, a topic, or another user in the social networking system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The permission manager 230 receives requests from requesting users to perform actions associated with one or more machines 135 connected to various users and determines whether a requesting user is authorized to perform an action via a machine 135. One or more permissions are associated with the machine 135, each permission associated with an action performed by the machine 135 and specifying one or more criteria to be satisfied for the action to be performed. An owner of the machine 135 configures the permissions associated with the machine 135 to limit actions that various other users may perform using the machine 135. A permission associated with an action specifies a type of connection between a user of the social networking system 140 and the owner of the machine 135 that authorizes the user to perform the action. The user of the social networking system 135 may be a machine 135, so a type of connection between a machine 135 and an additional machine 135 may authorize the machine 135 to perform an action using the additional machine 135. In one embodiment, the type of connection between a user and an owner of the machine 135 is based on whether the user is directly or indirectly connected to the owner of the machine 135; different types of indirect connections may be specified based on a number of intervening users between the user and the owner of the machine (i.e., based on a degree of separation between the user and the owner of the machine). For example, a permission associated with an action allows a user having a direct connection to the owner of the machine 135 to perform the action while preventing another user having an indirect connection to the owner of the machine 135 from performing the action. Alternatively, a permission specifies a connection strength of a connection between a user and an owner of the machine 135 authorizing the user to perform an action associated with the permission and preventing another user having a connection to the owner of the machine with less than the specified connection strength from performing the action.

In some embodiments, a permission associated with an action may specify a time interval during which a user satisfying criteria specified by the permission is authorized to perform the action. For example, a permission authorizes a user having an indirect connection to an owner of the machine 135 via the social networking system 140 to perform an action associated with the permission once during a twelve-hour interval. A time interval specified by a permission may be determined or modified by an owner of the machine 135. In some embodiments, one or more permissions associated with an action authorize users of the social networking system 140 who are not connected to the machine 135 or to an owner of the machine 135 to perform one or more actions. This allows certain actions to be performed by any social networking system users. Permissions authorizing users not connected to either a machine 135 or to an owner of the machine 135 may specify a time interval or a number of times a particular user is authorized to perform the action, or may specify other criteria to limit performance of the action by users not connected to either the machine 135 or to an owner of the machine 135.

When the permission manager 230 receives a request for a machine 135 to perform an action from a requesting user the permission manager 230 accesses the edge store 225 to determine connections between the requesting user and an object associated with the machine 135 and between the requesting user and one or more owners of the machine 135. If the edge store 225 includes a connection between a user profile of the requesting user and the object associated with the machine 135 indicating the requesting user is an owner of the machine 135, the permission manager 230 determines the requesting user is authorized to perform any action associated with the machine 135. However, if the permission manger 230 determines the edge store 225 does not include a connection between the object associated with the machine 135 and the user profile associated with the requesting user indicating the requesting user is an owner of the machine 135 or that the connection between the object associated with the machine 135 and the requesting user does not have a type matching a type specified by a permission associated with the action, the permission manager determines whether the requesting user is connected to an owner of the machine 135 based on information in the edge store 225. If the edge store 225 does not include a connection between the requesting user and the owner of the machine 135, the permission manager 230 prevents the machine 135 from performing the action.

However, if the edge store 225 includes information identifying a connection between the requesting user and the owner of the machine 135, the permission manager 230 determines a type of the connection between the requesting user and the owner of the machine 135 and compares the type of connection to a permission associated with the action identified by the request. If the type of connection between the requesting user and the owner of the machine matches a type of connection specified by the permission associated with the action, the permission manager 230 determines the requesting user is authorized to perform the action and communicates an instruction to perform the action to the machine 135. In some embodiments, users may establish direct connections to a machine 135 through the social networking system 140. A connection between a user and the machine 135 is associated with a type, as described above. When the permission manager 230 receives a request from the requesting user to perform the action, the permission manager 230 also determines a type of direct connection between the requesting user and the machine 135. If the social networking system 140 includes a direct connection between the requesting user and the machine 135 having a type satisfying a permission associated with the action, the permission manager 230 determines the requesting user is authorized to perform the action and communicates an instruction to perform the action to the machine 135. In various embodiments, the social networking system 140 may differently prioritize connections between the requesting user and the owner of the machine 135 and connections between the requesting user and the machine 135 when determining if the requesting user is authorized to perform the action. For example, a type of connection between the requesting user and the owner of the machine 135 may take precedence over a type of connection between the requesting user and the machine 135 when determining if the requesting user is authorized to perform an action using the machine 135. Determination of whether a requesting user is authorized to perform an action via a machine 135 based on connections between the requesting user and other users of the social networking system 140 is further described below in conjunction with FIGS. 3 and 4.

The web server 235 links the social networking system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the social networking system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Regulating Operation of a Machine Based on Social Networking System Information

Figure 3:
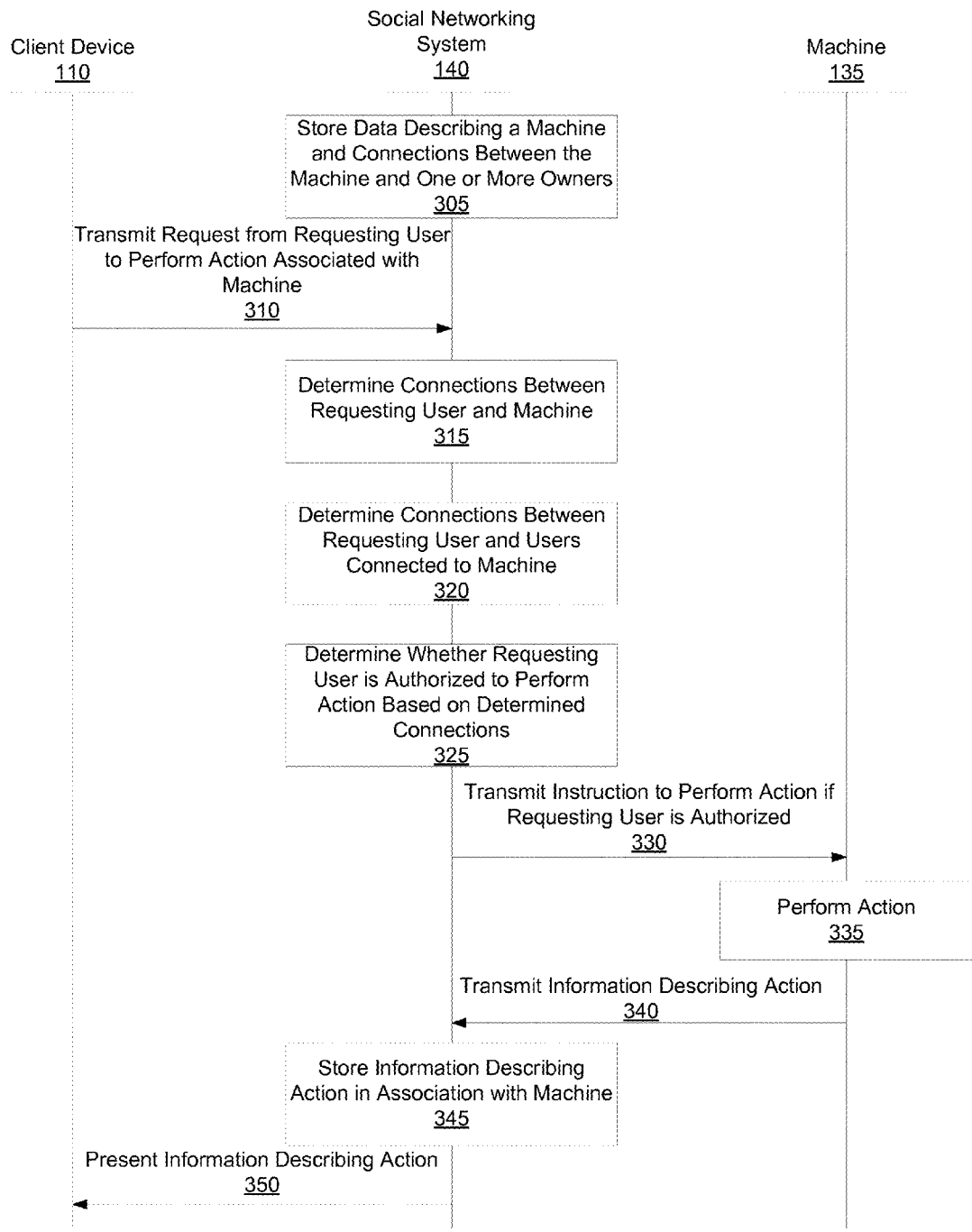
FIG. 3 is an interaction diagram of one embodiment of a method for regulating communication of an instruction for performing an action to a machine via a social networking system, in accordance with an embodiment.

FIG. 3 is an interaction diagram of one embodiment of a method for regulating communication of an instruction for performing an action to a machine 135 via a social networking system 140. In other embodiments, the method may include different and/or additional steps than those shown in FIG. 3. Additionally, steps of the method may be performed in different orders than the order described in conjunction with FIG. 3.

The social networking system 140 stores 305 data identifying the machine 135 and connections between one or more users of the social networking system 140 and the machine 135. For example, the social networking system 140 stores an object associated with the machine 135 including a machine identifier uniquely identifying the machine 135. The object associated with the machine 135 may include additional information associated with the machine 135, such as a name associated with the machine 135, model information of the machine 135, a description of the machine 135, or a location associated with the machine 135.

Figure 5:
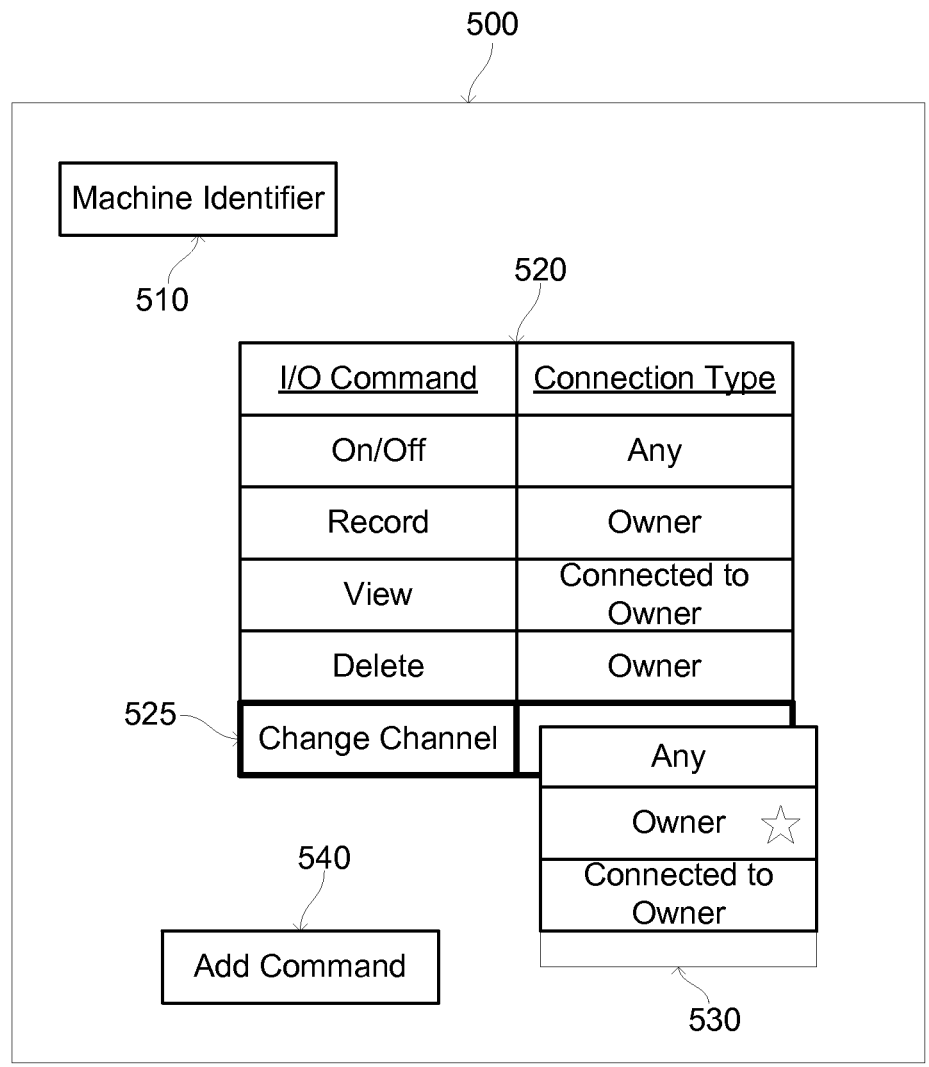
FIG. 5 is an example interface for an owner of a machine to describe actions performed by the machine via a social networking system, in accordance with an embodiment.

One or more connections between the machine 135 and users of the social networking system 140 are also stored 305. A connection between the machine 135 and at least one social networking system user capable of authorizing one or more actions associated with the machine 135, also referred to herein as an "owner" of the machine 135, is stored 305. An action performed by the machine 135 is associated with one or more permissions that regulate users capable of performing the action. The owner of the machine 135 specifies or modifies one or more permissions associated with the action. A permission associated with an action specifies a type of connection between a user of the social networking system 130 and the owner of the machine 135 that authorizes the user to perform the action. For example, a permission associated with an action allows a user having a direct connection to the owner of the machine 135 to perform the action via the machine 135 while preventing another user having an indirect connection to the owner of the machine 135 to perform the action via the machine 135. As another example, a permission associated with an action allows a user having a connection with at least a threshold connection strength to the owner of the machine 135 (e.g., a connection identifying the user as a family member of the owner of the machine 135) to perform the action via the machine 135, while preventing another user having a connection with less than the threshold connection strength to the owner of the machine 135 (e.g., a connection identifying the other user as a co-worker of the owner of the machine 135) from performing the action 135. Permissions associated with actions performed by the machine 135 may be stored by the social networking system 140 in association with the machine 135 or with an owner of the machine 135 or may be maintained by the machine 135. In some embodiments, the social networking system 140 presents the owner with an interface identifying the machine 135 and various actions associated with the machine 135. The owner selects an action from the interface and specifies one or more permissions associated with the selected action via the interface, with the specified permissions stored by the social networking system 140 in association with the selected action. FIG. 5 shows an example interface for specifying permissions associated with actions performed by a machine 135.

Additionally, the owner of the machine provides the social networking system 140 with descriptions associated with one or more actions performed by the machine 135. A description associated with an action includes information for presentation to one or more additional social networking system users when the action is performed. Further, the description associated with the action includes information mapping information included in a request to perform the action received by the social networking system 140 with commands or instructions for communicating to the machine 135 to perform the action. Similarly, the description associated with the action identifies content presented to one or more users of the social networking system 140 when an indication indicating the machine 135 performed the action is received by the social networking system 140 from the machine 135. For example, an application programming interface is received from the owner of the machine 135 and stored by the social networking system 140. The application programming interface (API) includes one or more calls associated with an action. An API call associated with an action associates instructions for the machine 135 to perform the action with information in a request received by the social networking system 140 to perform the action; additionally, the API specifies components of an API call received from the machine 135 when the machine performed the application. For example, the API includes information for identifying the action, the machine 135, and the user who requested performance of the action from an API call received from the machine 135.

A client device 110 associated with a requesting user of the social networking system 140 transmits 310 a request to perform an action associated with the machine 135 to the social networking system 140. The request includes an identifier associated with the requesting user, an identifier associated with the machine 135, and a description of the action for the machine 135 to perform. Upon receiving the request, the social networking system 140 determines 315 whether a connection between the requesting user and the machine 135 is stored by the social networking system 140.

The social networking system 140 also determines 320 connections between the requesting user and one or more users connected to the machine and capable of authorizing one or more actions associated with the machine 135 (i.e., connections between the requesting user and one or more owners of the machine 135). Based on the connections between the requesting user and one or more owners of the machine 135, the social networking system 140 determines 325 whether the requesting user is authorized to perform the action using the machine 135. In some embodiments, the social networking system 140 determines 325 whether the requesting user is authorized to perform the action based on a connection between the user and the machine 135; if no connection exists between the requesting user and the machine 135 or if the type of connection between the user and the machine 135 does not match a type specified by a permission associated with the action, the social networking system 140 determines 320 connections between the requesting user and one or more owners of the machine 130. In these embodiments, if a connection between the requesting user and the machine 135 has a type satisfying a type specified by a permission associated with the action 135, the social networking system 140 may determine 325 the requesting user is authorized to perform the action, as further described below, without determining 320 connections between the requesting user and one or more owners of the machine 135. Alternatively, the social networking system 140 determines 315 connections between the requesting user and the machine 135 and also determines 320 connections between the requesting user and one or more owners of the machine 135, and determines 325 whether the requesting user is authorized to perform the actions based on types of connections between the requesting user and the machine 135 and types of connections between the requesting user and one or more owners of the machine 135.

To determine 325 whether the requesting user is authorized to perform the action, the social networking system 140 determines a type associated with a connection between the requesting user and an owner of the machine 135 and compares the determined type to types of connections specified by permissions associated with the action. If the determined type matches a type of connection specified by a permission associated with the action, the social networking system 140 determines 325 the requesting user is authorized to perform the action. However, if the determined type of connection does not match a type of connection specified by a permission associated with the action, the social networking system 140 determines 325 the requesting user is not authorized to perform the action. As described above in conjunction with FIG. 2, a type of connection between the requesting user and the machine 135 may be compared to the type of connection specified by a permission associated with the action, with the social networking system 140 determining 325 the requesting user is authorized to perform the action if the type of connection between the user and the machine 135 matches the type of connection specified by the permission and determining 325 the requesting user is not authorized to perform the action if the type of connection between the user and the machine 135 does not match the type of connection specified by the permission.

For example, the social networking system 140 includes a connection between the requesting user and an owner of the machine 135 with a connection strength having a specified value (e.g., a connection indicating the requesting user is a family member of the owner of the machine 135), so the social networking system 140 determines 325 the requesting user is authorized to perform actions via the machine 135 that are associated with permissions specifying a connection having the specified value of connection strength; however, the requesting user is not determined 325 to be authorized to perform actions via the machine 135 associated with permissions specifying a different value of connection strength. As another example, the social networking system 140 determines 325 whether the requesting user is authorized to perform the action based on whether a connection between the requesting user and the owner of the machine 135 is direct or indirect. For example, permissions associated with the machine allow users directly connected to the owner of the machine 135 to perform a set of actions, while limiting users indirectly connected to the owner of the machine 135 (e.g., users connected to an additional user that is connected to the owner of the machine 135) to performing a reduced set of actions via the machine 135. In this example, the social networking system 140 compares the type of connection between the requesting user and the owner of the machine (i.e., whether the requesting user has a direct connection or an indirect connection to the owner of the machine 135) to a type of connection specified by a permission associated with the action; if the type of connection between the requesting user and the owner of the machine 135 matches the type of connection associated with the permission, the requesting user is determined 325 to be authorized to perform the action.

In some embodiments, the permissions are hierarchical, so a user having a type of connection to the owner of the machine 135 matching a type of connection specified by permission associated with an action is also authorized to perform additional actions associated with one or more additional types of connections to the owner of the machine 135. For example, if a user has a direct connection to an owner of the machine 135, the user is authorized to perform actions associated with permissions specifying a direct connection to the owner of the machine 135 as well as actions associated with permissions specifying an indirect connection to the owner of the machine 135. However, in this example, another user having an indirect connection to the owner of the machine 135 is not authorized to perform actions associated with permissions specifying a direct connection to the owner of the machine 135. In some embodiments, the social networking system 140 determines different types of indirect connections to the owner of the machine 135 proportional to a number of intervening users between the requesting user and the owner of the machine 135. For example, if the requesting user is connected to an additional user that is connected to the owner of the machine 135, the social networking system 140 determines the requesting user has a first-order indirect connection to the owner of the machine 135; as another example, if the requesting user is connected to an additional user that is connected to another user that is connected to the owner of the machine 135, the social networking system 140 determines the requesting user has a second-order indirect connection to the owner of the machine. Different types of indirect connections may be associated with different permissions to regulate the actions of the machine capable of being performed by users based on the number of intervening users between a user and the owner of the machine 135 (e.g., users with a greater number of intervening users between the user and the owner of the machine 135 are authorized to perform fewer actions).

Additionally, the received request may include an amount of compensation to the owner of the machine 135 from the requesting user if the action is performed. The social networking system 140 may account for the amount of compensation in addition to the type of connection between the requesting user and the owner of the machine 135 when determining 325 whether the requesting user is authorized to perform the action. For example, the owner of the machine 135 associates amounts of compensation with one or more actions, allowing a requesting user to be authorized to perform an action if the requesting user provides the owner of the machine 135 with at least the amount of compensation associated with the action. In one embodiment, the owner of the machine 135 authorizes a requesting user identifying at least an amount of compensation matching an amount of compensation with an action to perform the action even if a connection between the requesting user and the owner of the machine 135 does not match a type of connection specified by a permission associated with the action. Alternatively, the requesting user is not determined 325 to be authorized to perform the action unless the connection between the requesting user and the owner of the machine 135 has a type matching a type of connection specified by a permission associated with the action and the requesting user includes at least a threshold amount of compensation in the request. In some embodiments, the social networking system 140 determines a time interval during which the requesting user is authorized to perform the action based on the amount of compensation in the request. For example, if the type of connection between the requesting user and the owner of the machine 135 authorizes the requesting user to perform the action, the requesting user is authorized to perform the action for a time interval proportional to the amount of compensation. When the time interval lapses, the requesting user is not authorized to perform the action, and may transmit 310 an additional request to the social networking system 140 to perform the action.

If the social networking system 140 determines 325 the requesting user is authorized to perform the action, the social networking system 140 transmits 330 an instruction to perform the action to the machine 135, which performs 335 the action based on the instruction. For example, the instruction is a control signal causing the machine 135 to perform the action upon receipt of the control signal. Different types of machines 135 may perform 335 different types of actions based on an instruction received from the social networking system 140. Example actions performed by the machine 135 include: changing a position of the machine 135, capturing video data, capturing audio data, retrieving stored data, modifying one or more parameters or settings of the machine 135, changing a state of the machine 135, or any other suitable action. In some embodiments, if the social networking system 140 determines 325 the requesting user is not authorized to perform the action, the social networking system 140 communicates a notification to the client device 110 indicating the request is unable to be performed for presentation to the requesting user.

When the machine 135 performs 335 the action, information describing the action may be transmitted 340 from the machine to the social networking system 140, which stores 345 the information describing the action. For example, the machine 135 transmits 340 an indication that the action was performed identifying the action, a time associated with the action (e.g., a date and time when the action was completed, a date and time when the action was initiated), and information identifying the requesting user; the social networking system 140 stores 345 a description of the action and the time associated with the action in conjunction with the object associated with the machine 135. For example, the indication is an application programming interface (API) call transmitted 340 from the machine 135 to the social networking system that identifies the action, the machine 135, and the requesting user, as well as information associated with the action. The social networking system 140 extracts the action and the other information from the API call based on stored descriptions of actions associated with the machine by the owner of the machine 135. The indication transmitted by the machine 135 to the social networking system 140 may also include information describing one or more results from performing the action. For example, a result indicates if the action was successfully completed, includes information describing operation of the machine when performing the action, includes a time when the action was completed, or other suitable information. If the action retrieves information from the machine 135, the machine 135 transmits 340 the retrieved information to the social networking system 140. In some embodiments, the social networking system 140 stores the retrieved information then communicates the retrieved information to the client device 110 for presentation to the requesting user. Alternatively, the social networking system 140 communicates the retrieved information to the client device 110 for presentation to the requesting user without storing 345 the retrieved information. Additionally, the social networking system 140 stores an association between the performed action and the requesting user, allowing the action to be used when selecting content for subsequent presentation to the user. In other embodiments, after determining 325 the user is authorized to perform the action, the social networking system 140 establishes a connection between the client device 110 and the machine 135, allowing the user associated with the client device 110 to directly communicate with the machine 135 to perform the action.

In some embodiments, the social networking system 140 presents 350 information describing the action to the requesting user via the client device 110, and may also present information describing the action to additional users having a connection to the requesting user. For example, the social networking system 140 presents 340 a notification message to the user via the client device 110 indicating the machine 135 performed 335 the action and may include information received from the machine based on the action in the notification message.

To present information describing the action, the social networking system 140 generates a content item identifying the requesting user, identifying the machine 135, and describing the action, and presents the generated content to additional users connected to the requesting user via the social networking system 140. If information from the machine 135 is received when the action was performed, a portion of the received information may be included in the received content item. Similarly, one or more results from performing the action may be included in the generated content item. Results from performing the action or information received from the machine 135 included in the content item may be specified by a description associated with the action, allowing the owner of the machine 135 to regulate information from the machine 135 presented to other social networking system users. In some embodiments, the description associated with the action associates different types of information or different types of results with different types of connections between other users and the owner of the machine 135, so the information or result from the action presented to another user in a content item is based at least in part on the other user's connection to the owner of the machine 135. The social networking system 140 includes the content item in a selection process that selects content for presentation to users of the social networking system 140 connected to the requesting user via the social networking system 140. In one embodiment, the content item is included in a selection process generating a feed of content items for presentation to the user. For example, the content item is a story identifying the requesting user, the machine 135, and the action for presentation in a news feed to a user connected to the requesting user, where the news feed includes various stories describing actions performed by additional users connected to the user.

Additionally, the owner may request information from the social networking system 140 describing actions performed by the machine 135. In one embodiment, the owner communicates a request to the social networking system 140 identifying the machine 135 and one or more criteria for actions performed by the machine 135. Example criteria for actions performed by the machine 135 include: a time interval in which actions were performed, a type of action, a location associated with an action, a specific action, a type of connection between requesting users and the owner of the machine 135, information received from the machine 135 performing the action, a type of connection between requesting users and the machine, and a result from performing the action. The social networking system 140 retrieves stored information identifying actions performed by the machine 135 and identifies one or more actions associated with the machine 135 and satisfying criteria included in the request. For example, the social networking system 140 identifies actions performed by the machine 135 within a specified time interval or identifies actions performed by the machine 135 and having a type specified by the request 135. Information describing the identified actions is communicated from the social networking system 140 to a client device 110 associated with the owner of the machine 135 for presentation to the owner. For example, an interface identifying the machine 135 and including information associated with the identified actions (e.g., a user who performed an action, a time when the action was performed, a result of the action, etc.) is presented to the owner of the machine 135 via a client device 110.

In some embodiments, the owner of the machine 135 may retrieve information identifying additional machines associated with the owner from the social networking system 140. The owner communicates a request to identify machines associated with the owner to the social networking system 140, which accesses stored connections associated with the user to identify machines 135 having a connection to the owner identifying the owner as a user capable of authorizing one or more actions associated with the machines. Information identifying machines 135 with which the owner is connected and capable of authorizing one or more actions is then presented to the owner by the social networking system 140. For example, names or other identifying information associated with machines 135 that the owner owns is presented to the user. From the presented information, the owner may select a machine 135 to view information associated with the machine 135, such as actions performed using the machine, or to modify permissions associated with various actions capable of being performed by the machine 135.

In some embodiments, the machine 135 transmits 340 information to the social networking system for presentation to the user without receiving instructions for performing an action from the social networking system 140. For example, the machine 135 transmits information identifying one or more maintenance actions to be performed when the machine 135 determines certain criteria have been satisfied (e.g., a time interval has elapsed, data measured by the machine 135 satisfies one or more criteria stored by the machine). As an example, the machine 135 transmits information identifying one or more maintenance actions to the social networking system 140 for presentation to the user, to an owner of the machine 135, or to another user connected to the machine 135 or to an owner of the machine 135. The social networking system 140 may store 345 the information describing the action to be performed specified by the information received by the machine 135 and present 350 the information describing the action to the owner of the machine 315 via the client device 110. By presenting 350 the information describing the action to the owner of the machine 135 via the social networking system 140, the machine 135 provides the user with a prompt, such as a reminder, to perform an action (e.g., changing the oil of a car) to request the machine 135 to perform the action at an identified time future time. The description of actions associated with the machine may identify actions for which the social networking system 140 presents 350 information received from the machine 135 when the user has not requested the machine 135 perform an action or identify a frequency with which the social networking system 140 presents information received form the machine when the user did not previously request the machine 135 to perform an action.

Figure 4:
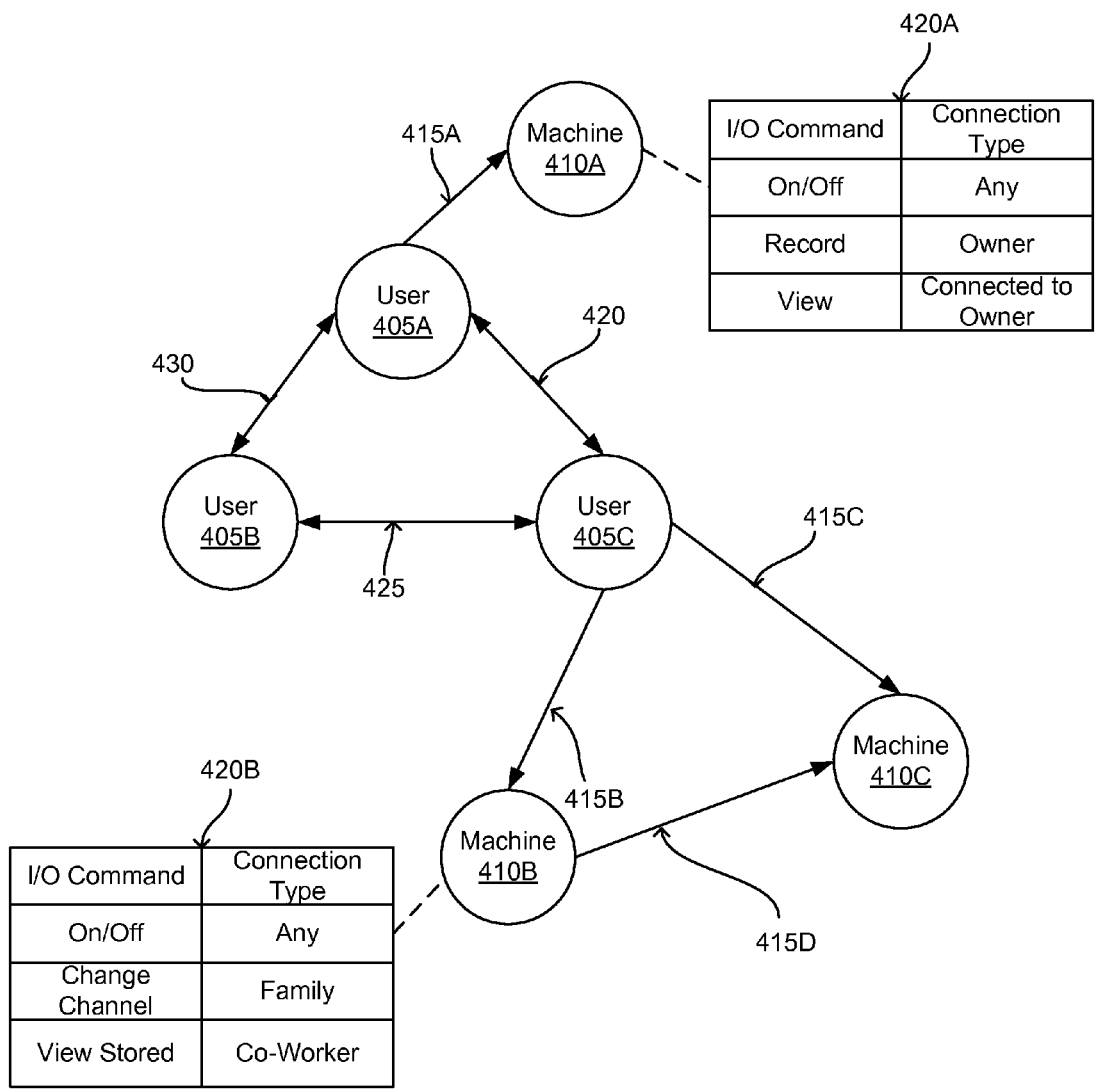
FIG. 4 is a conceptual diagram of information included in a social networking system describing connections between one or more users and one or more machines, in accordance with an embodiment.

FIG. 4 is a conceptual diagram of information included in a social networking system 140 describing connections between one or more users and one or more machines. In the example of FIG. 4, connections between various users 405A, 405B, 405C (also referred to individually and collectively using reference number 405) and various machines 410A, 410B, 410C (also referred to individually and collectively using reference number 410). For purposes of illustration, FIG. 4 shows three users 405A, 405B, 405C and three machines 410A, 410B, 410C; however, any number of users 405 and machines 410 may be identified by the social networking system 140.

In the example of FIG. 4, the social networking system 140 stores a connection 415A between user 405A and machine 410A indicating that user 405A is capable of authorizing one or more actions associated with machine 410A, so user 405A is an "owner" of machine 410A. Similarly, a connection 415B between user 405C and machine 410B identifies user 405C as an owner of machine 410B and a connection 415C between user 405C and machine 410C identifies user 405C as an owner of machine 410C. In the example of FIG. 4, a connection 420 between user 405A and user 405C has a connection strength indicating that user 405A is a co-worker of user 405C, while a connection 425 between user 405C and user 405B has a higher connection strength than the connection 420, which indicates that user 405C and user 405B are family members. Additionally, a connection 430 between user 405A and user 405B has a connection strength indicating that user 405A and user 405B are friends. In the example of FIG. 4, the social networking system 140 also stores a connection 415D between machine 410B and machine 410C. Connection 415D may indicate that machine 410B is an owner of machine 410C, that machine 410B is authorized to perform certain actions using machine 410C, that machine 410B receives information from machine 410C, or is otherwise capable of performing interactions with machine 410C based on permissions associated with machine 410C.

As shown in FIG. 4, machine 410A is associated with permissions 420A identifying input/output commands associated with machine 410A and a type of connection between a user authorized to perform an input/output command and to an owner of machine 410A (which is capable of performing any input/output command associated with machine 410A). In the example of FIG. 4, the connection type specified by permissions 420A is based on whether a user authorized to perform an input/output command has a direct connection or an indirect connection to an owner of machine 410A. In the example of FIG. 4, permissions 420A authorize a user with any type of connection, either direct or indirect, to an owner of machine 410A to turn machine 410A on or off, authorize an owner of machine 410A to record data via machine 410A, and authorize a user indirectly connected to an owner of machine 410A to view data captured by machine 410A. Additionally, permissions 420A are hierarchical, so a user having a direct connection to an owner of machine 410A is also authorized to perform actions that a user with an indirect connection to the owner of machine 410A is authorized to perform. In FIG. 4, permissions 420 identify a type of indirect connection between a user authorized to view data capture by machine 410A, limiting viewing of the data to users that are connected to a single intervening user that is connected to an owner of machine 410A (i.e., a user with one degree of separation from the owner of machine 410A), and preventing users connected to a series of intervening users between the user and the owner of machine 410A (i.e., a user with two or more degrees of separation from the owner of the machine 410A) from viewing the data. Hence, in FIG. 4, the social networking system 140 authorizes a request from user 405A to record data via machine 410A, while denying a request from user 405B or user 405C to record data via machine 410A. Additionally, the social networking system 140 authorizes a request from user 405A, user 405B, or user 405C to view data captured by machine 410A.

Also in FIG. 4, permissions 420B are associated with machine 410B to identify types of connections between a user authorized to perform an action via machine 410B and an owner of machine 410B. Permissions 420B specifies connection types based on a connection strength between a user and an owner of machine 420B. In the example of FIG. 4, permissions 420B authorize users with any type of connection to an owner of machine 420B to turn machine 420B on or off, authorize a user having a connection to an owner of machine 420B with a connection strength indicating the user is a family member of the owner of machine 420B to change a channel of machine 420B, and authorize a user having a connection to an owner of machine 420B with a connection strength indicating the user is a co-worker of the owner of machine 420B to view content stored by machine 420B. Hence, because the connection 425 between user 405B and user 405C has a connection strength indicating user 405B and user 405C are family, the social networking system 140 authorizes a request from user 405B to change a channel of machine 420B; however, because the connection 420 between user 405A and user 405C has a connection strength indicating user 405A is a co-worker of user 405C, the social networking system 140 does not authorize a request from user 405A to change a channel of machine 420B, but authorizes a request from user 405A to view content stored by machine 420B.

FIG. 5 is an example interface 500 for an owner to describe actions performed by a machine 135 via a social networking system 140. The interface 500 is communicated from the social networking system 140 to a client device 110 associated with the owner for presentation. In the example of FIG. 5, the interface 500 includes a machine identifier 510 associated with the machine 135, a set 520 of commands associated with the machine 135, and an interface element 540 for adding a command associated with the machine 135. However, in other embodiments, the interface 500 may include different and/or additional components than those described in conjunction with FIG. 5.

The machine identifier 510 presented by the interface 500 is information identifying a particular machine 135. For example, the machine identifier 510 is a unique identifier associated with the machine 135 by the social networking system 140. As another example, the machine identifier 510 is a name or title associated with the machine 135 by the owner. In some embodiments, the owner may access the machine identifier 510 via the interface 500 and modify a name or a title associated with the machine 135 by the social networking system 140.

Along with the machine identifier 510, the interface 500 shown in FIG. 5 presents a set 520 of commands associated with the machine 135. The set 520 identifies various commands communicated to the machine 135 to cause the machine to perform an action as well as one or more permissions associated with each command. In the example of FIG. 5, the permission associated with a command is a type of connection between a user and the owner of the machine 135 or between the user and the machine 135, as further described above in conjunction with FIGS. 3 and 4. However, in other embodiments, any suitable information associated with a connection between a user and the owner of the machine 135 or with the machine 135.

To associate a permission with a command, the owner selects a command from the set 520, causing the interface 500 to present options 530 for permissions to associate with the selected command 525. The options 530 for permissions may be presented in a list, in drop down menu, or in any other suitable format. In some embodiments, a default permission is associated with the selected command 525, and may be visually distinguished from other permissions in the options 530. If a permission is currently associated with the selected command 525, the options 530 may visually distinguish the currently associated permission from other permissions. When the owner selects a permission from the options 530, the selected permission is communicated to the social networking system 140 for association with the selected command 525 performed by the machine 135 associated with the machine identifier 510.

Additionally, the interface 500 may include an interface element 540 for associating additional commands with the machine 135. If the owner selects the interface element 540, the social networking system 140 may retrieve information from the machine 135, such as descriptions of additional actions performed by the machine 135. Alternatively, if the owner selects the interface element 540, the social networking system 140 prompts the owner to provide information describing an additional action. The information describing the additional action may include an instruction for communication to the machine 135, a result or information received from the machine 135 when the action has been performed, and one or more permissions associated with the additional action. The social networking system 140 stores the information describing the additional action in association with the machine 135 for subsequent use by other social networking system users 140.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
storing, in a social networking system, data describing a machine and an owner of the machine, the owner comprising a user of a plurality of users of the social networking system who is capable of authorizing one or more actions associated with the machine;
receiving, from the owner, a description of each action of the one or more actions associated with the machine;
receiving a request from a client device of a requesting user of the social networking system to perform one of a plurality of different types of actions using the machine, the client device different than the machine;
determining, from the social networking system, that the requesting user of the different client device is authorized to perform the plurality of different types of actions based at least in part on a type of connection in the social networking system between the requesting user and the owner and one or more permissions associated with the plurality of different types of actions, the type of connection in the social networking system based on a relationship between the requesting user and the owner in the social networking system including, at least, a direct connection to the owner of the machine, or a direct connection to the machine;
communicating an instruction authorizing the machine to perform for the requesting user of the different client device at least one of the plurality of different types of actions from the social networking system to the machine responsive to determining that the requesting user is authorized to perform the plurality of different types of actions using the machine;

receiving an indication from the machine that the at least one of the plurality of different types of actions was performed by the machine; and generating a content item describing the at least one of the plurality of different types of actions based on a description of the at least one of the plurality of different types of actions received from the owner, the content item identifying the requesting user, the at least one of the plurality of different types of actions, and the machine.

2. The method of claim 1, further comprising:
presenting the content item to one or more users connected to the requesting user via the social networking system.

3. The method of claim 2, wherein presenting the content item to one or more users connected to the requesting user via the social networking system comprises:
including the content item in a feed of content items presented to the one or more users connected to the requesting user via the social networking system, one or more content items in the feed describing actions associated with other users connected to the one or more users connected to the requesting user via the social networking system.

4. The method of claim 1, wherein receiving the indication from the machine that the at least one of the plurality of different types of actions was performed by the machine comprises:
receiving an application programming interface call from the machine, the application programming interface call identifying the at least one of the plurality of different types of actions, the machine, and the requesting user; and
extracting the at least one of the plurality of different types of actions from the application programming interface call based at least in part on the received descriptions of the one or more actions associated with the machine.

5. The method of claim 1, further comprising:
storing information associated with the requesting user identifying the at least one of the plurality of different types of actions and the machine.

6. The method of claim 1, further comprising:
storing information associated with the machine that identifies the requesting user and the at least one of the plurality of different types of actions.

7. The method of claim 1, wherein the indication includes one or more results from performing the at least one of the plurality of different types of actions.

8. The method of claim 7, wherein the content item further identifies at least one result from the one or more results.

9. The method of claim 1, wherein receiving the description of each action of the one or more actions associated with the machine further comprises:
presenting an interface to the owner of the machine identifying the one or more actions associated with the machine;
receiving a selection of an action from the owner of the machine;
receiving one or more permissions associated with the action from the owner of the machine via the interface.

10. The method of claim 1, further comprising:
receiving a request from the owner of the machine to identify actions performed using the machine;
identifying one or more actions associated with the received indications from the machine; and
presenting information describing the identified one or more actions to the owner of the machine.

11. The method of claim 1, further comprising:
receiving a request from the owner to identify machines associated with the owner;
identifying one or more additional machines associated with the owner; and
presenting information describing the machine and the identified one or more additional machines to the owner.

12. A method comprising:
storing, in a social networking system, data describing a machine and an owner of the machine, the owner comprising a user of a plurality of users of the social networking system who is capable of authorizing one or more actions associated with the machine;
receiving, from the owner, data describing the one or more actions associated with the machine, the data identifying information for communication from the social networking system to the machine for the machine to perform each of the one or more actions;
storing information received from the owner of the machine including a description of each action of the one or more actions associated with the machine;
receiving a request from a client device of a requesting user of the social networking system to perform one of a plurality of different types of actions using the machine, the client device different than the machine;
communicating an instruction authorizing the machine to perform for the requesting user of the different client device at least one of the plurality of different types of actions from the social networking system to the machine if the social networking system determines that the requesting user is authorized to perform the plurality of different types of actions using the machine based at least in part on a type of connection in the social networking system between the requesting user and the owner and one or more permissions associated with the plurality of different types of actions, the type of connection in the social networking system based on a relationship between the requesting user and the owner in the social networking system including, at least, a direct connection to the owner of the machine, or a direct connection to the machine;
receiving an indication from the machine that the at least one of the plurality of different types of actions was performed by the machine; and
generating a content item describing the at least one of the plurality of different types of actions based on a description of the at least one of the plurality of different types of actions received from the owner, the content item identifying the requesting user, the at least one of the plurality of different types of actions, and the machine.

13. The method of claim 12, wherein receiving the indication from the machine that the at least one of the plurality of different types of actions was performed by the machine comprises:
receiving an application programming interface call from the machine, the application programming interface call identifying the at least one of the plurality of different types of actions, the machine, and the requesting user; and
extracting the at least one of the plurality of different types of actions from the application programming interface call based at least in part on the descriptions of the one or more actions associated with the machine.

14. The method of claim 12, wherein receiving, from the owner, data describing the one or more actions associated with the machine comprises:

presenting an interface to the owner of the machine identifying the one or more actions associated with the machine;
receiving a selection of an from the owner of the machine;
receiving one or more permissions associated with the action from the owner of the machine via the interface.

15. The method of claim 12, further comprising:
receiving a request from the owner of the machine to identify actions performed using the machine, the request including one or more criteria;
identifying one or more actions associated with the received indications from the machine, the one or more actions satisfying at least a threshold number of the one or more criteria; and
presenting information describing the identified one or more actions to the owner of the machine.

16. The method of claim 15, wherein the one or more criteria is selected from a group consisting of: a time interval, a type of action, a location, a type of connection between the requesting user and the owner of the machine, information received by the social networking system from the machine, a result from performing the at least one of the plurality of different types of actions, and any combination thereof.

17. The method of claim 12, further comprising:
receiving a request from the owner to identify machines associated with the owner;
identifying one or more additional machines associated with the owner; and
presenting information describing the machine and the identified one or more additional machines to the owner.

18. A computer program product embodied in a non-transitory computer readable storage medium having instructions encoded thereon that, when executed by a hardware processor, cause the hardware processor to:
store, in a social networking system, data describing a machine and an owner of the machine, the owner comprising a user of a plurality of users of the social networking system who is capable of authorizing one or more actions associated with the machine;
receive, from the owner, data describing the one or more actions associated with the machine, the data identifying information for communication from the social networking system to the machine for the machine to perform each of the one or more actions;
store information received from the owner of the machine including a description of each action of the one or more actions associated with the machine;
receive a request from a client device of a requesting user of the social networking system to perform one of a plurality of different types of actions using the machine, the client device different than the machine;
communicate an instruction authorizing the machine to perform for the requesting user of the different client device at least one of the plurality of different types of actions from the social networking system to the machine if the social networking system determines that the requesting user is authorized to perform the plurality of different types of actions using the machine based at least in part on a type of connection in the social networking system between the requesting user and the owner and one or more permissions associated with the plurality of different types of actions, the type of connection in the social networking system based on a relationship between the requesting user and the owner in the social networking system including, at least, a direct connection to the owner of the machine, or a direct connection to the machine;
receive an indication from the machine that the at least one of the plurality of different types of actions was performed by the machine; and
generate a content item describing the at least one of the plurality of different types of actions based on a description of the at least one of the plurality of different types of actions received from the owner, the content item identifying the requesting user, the at least one of the plurality of different types of actions, and the machine.

19. The computer program product of claim 18, wherein the non-transitory computer readable storage medium further has instructions encoded thereon that, when executed by the hardware processor, cause the hardware processor to:
present the content item to one or more users connected to the requesting user via the social networking system.

20. The computer program product of claim 18, wherein receive the indication from the machine that the at least one of the plurality of different types of actions was performed by the machine comprises:
receive an application programming interface call from the machine, the application programming interface call identifying the at least one of the plurality of different types of actions, the machine, and the requesting user; and
extract the at least one of the plurality of different types of actions from the application programming interface call based at least in part on the descriptions of the one or more actions associated with the machine.

* * * * *